United States Patent
Howie, Jr. et al.

(10) Patent No.: US 8,163,810 B2
(45) Date of Patent: Apr. 24, 2012

(54) RESINOUS COMPOSITION COMPRISING SPECIAL VISUAL EFFECT ADDITIVE AND METHOD

(75) Inventors: Douglas Howie, Jr., Parkersburg, WV (US); Satish Kumar Gaggar, Parkersburg, WV (US)

(73) Assignee: Sabic Innovative Plastics IP B.V. (NL)

( * ) Notice: Subject to any disclaimer, the term of this patent is extended or adjusted under 35 U.S.C. 154(b) by 1643 days.

(21) Appl. No.: 11/379,283

(22) Filed: Apr. 19, 2006

(65) Prior Publication Data
US 2007/0249742 A1    Oct. 25, 2007

(51) Int. Cl.
C08J 9/00 (2006.01)
B29C 44/34 (2006.01)
C08F 14/00 (2006.01)

(52) U.S. Cl. ............ 521/85; 521/77; 521/142; 521/146; 521/149

(58) Field of Classification Search ............ 521/85, 521/149, 77, 142, 146
See application file for complete search history.

(56) References Cited

U.S. PATENT DOCUMENTS

| | | | |
|---|---|---|---|
| 5,009,809 A | 4/1991 | Kosin et al. | |
| 5,009,810 A | 4/1991 | Kosin et al. | |
| 5,037,580 A * | 8/1991 | Garcia et al. | 521/76 |
| 5,045,570 A | 9/1991 | Kosin et al. | |
| 5,234,963 A | 8/1993 | Garcia et al. | |
| 5,486,543 A * | 1/1996 | Shinada et al. | 521/149 |
| 5,611,962 A | 3/1997 | Garcia et al. | |
| 5,621,015 A | 4/1997 | Garcia et al. | |
| 5,710,189 A | 1/1998 | Brandt | |
| 5,747,548 A | 5/1998 | Brandt | |
| 5,847,017 A | 12/1998 | Brandt | |
| 6,562,447 B2 | 5/2003 | Wu et al. | |
| 6,617,295 B2 | 9/2003 | Nitzsche | |
| 6,784,216 B1 | 8/2004 | Zehner et al. | |
| 6,890,965 B1 | 5/2005 | Johnson et al. | |
| 2003/0096899 A1 * | 5/2003 | Pearce | 524/474 |
| 2005/0080164 A1 | 4/2005 | Gerus et al. | |

FOREIGN PATENT DOCUMENTS

| | | | |
|---|---|---|---|
| JP | 49-087755 | | 8/1974 |
| JP | 49-87755 | * | 8/1974 |
| JP | 62-089743 | | 4/1987 |
| JP | 63-039948 | | 2/1988 |
| JP | 63-39948 | * | 2/1988 |

* cited by examiner

*Primary Examiner* — Randy Gulakowski
*Assistant Examiner* — Kara Negrelli
(74) *Attorney, Agent, or Firm* — Cantor Colburn LLP

(57) ABSTRACT

Disclosed is a method for substantially diminishing or essentially eliminating a visible knitline in an article derived from a resinous composition comprising at least one thermoplastic resin and at least one special visual effect additive, which comprises the steps of (i) including in the composition an effective amount of at least one chemical foaming agent, and (ii) forming the article in a process that produces a knitline, wherein the article exhibits a substantially diminished or essentially no visible knitline compared to a similar article prepared without chemical foaming agent. Also disclosed are resinous compositions related thereto. Articles made from the compositions are also disclosed.

20 Claims, 1 Drawing Sheet

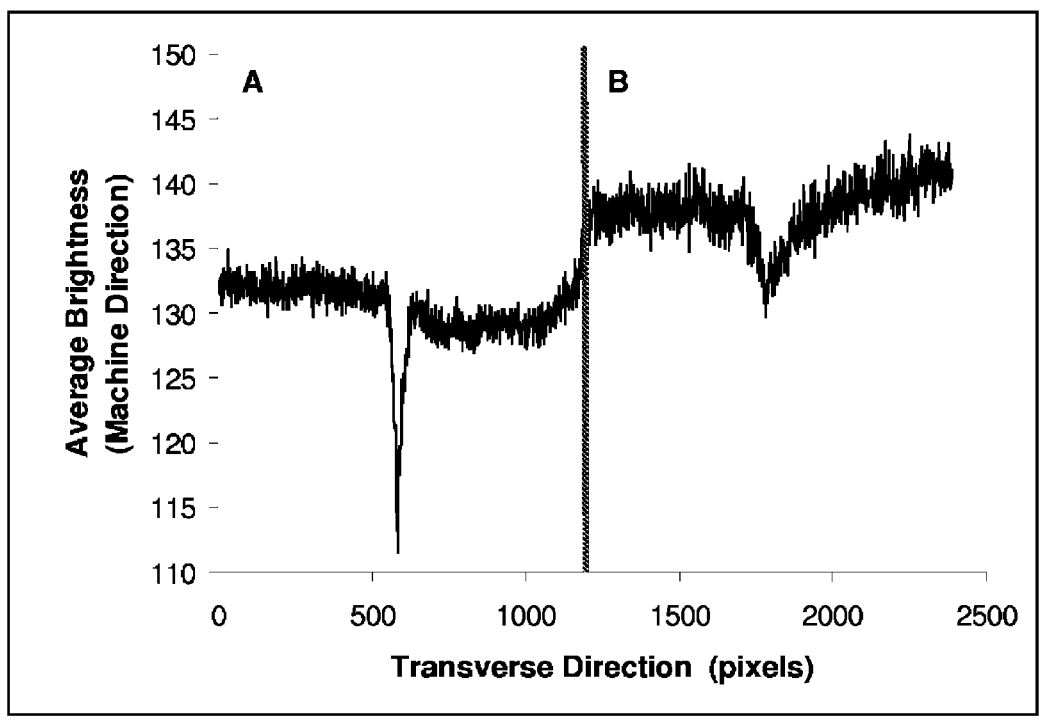

RESINOUS COMPOSITION COMPRISING SPECIAL VISUAL EFFECT ADDITIVE AND METHOD

BACKGROUND

The present invention relates to a method for substantially diminishing or essentially eliminating a visible knitline in formed plastic articles and to resinous compositions directed thereto.

Current trends in consumer products have created an unprecedented demand for plastic articles having unique color and surface appearance. For example, cellular telephones having interchangeable plastic covers are now commonly available. These covers come in a variety of colors and/or special surface effects, giving consumers control over the aesthetic design of their phones. Many other injection molded plastic products, such as, for example, computers, stereos and other consumer and/or business equipment, automotive interiors, etc., also benefit from having unique color and surface appearance. Plastic articles having a sparkling look, a metallescent or metal-like look, a true metal appearance, or any angular metameric appearance are desirable in many instances. Plastic articles having a sparkling or metallescent look can be created by incorporating a special visual effect additive such as free metal flakes into a plastic article at such loading that the individual flakes can be distinguished by the naked eye, resulting in an article with a sparkling or metallescent appearance. Plastic articles having a true metallic look can be created by using a much higher loading of free metal flakes. The drawback to products incorporating free metallic flakes is that the flakes have a high aspect ratio, and high reflectivity and therefore tend to change orientation at knitlines or other areas of non-uniform flow direction, aligning themselves with the flow field during processing, thereby causing visible flowlines, knitlines or weldlines and/or unacceptable variations in color or reflectivity in the finished product. Such flowlines, knitlines or weldlines produce unattractive streaks, marring the product's surface appearance. Thus, sparkling, metallescent and/or metal-looking plastic articles are often difficult to prepare by incorporating free metallic flakes into plastic articles.

There is presently no reliable method to ensure that pigments and additives having a high aspect ratio are optically anisotropic and rheologically isotropic when processed into plastic articles. Cubes and octahedra seem to satisfy these two conditions, and in fact, existing techniques have attempted to resolve the directionality problem of flake materials by encapsulating the flake materials in a substantially cubic material. While cubic shaped materials are less sensitive to flow-induced orientation than flakes are, and thereby reduce the appearance of flowlines, this technique does not eliminate flowlines. Additionally, producing particles of complicated geometries (i.e., other than spheres and platelets) is non-trivial, and introduces unnecessary filler mass to the final product. As a result, considerable efforts have focused on the investigation of processing changes to diminish or eliminate flowlines. In some instances, depending upon such factors as plastic article geometry, mold tooling can be modified to minimize the appearance of flowlines or to re-locate them to hidden portions of the plastic article. Sequential gating, the use of complicated mold temperature profiles, and agitation of the mold have been found to reduce the appearance of flowlines considerably. However, these methods are not always possible or successful, and all require the use of highly specialized equipment, making them uneconomical and impractical. Alternatively, using aluminum beads has been investigated as a possible solution. However, due to the absence of facets or sizeable reflective surfaces in aluminum beads, a reflective metallic look cannot be achieved in the end product. Thus, there is a need for systems and methods that ensure that the angular distribution of materials with high aspect ratios (for example, plate-like/flake pigments and additives) in complex flow fields remains optically anisotropic and rheologically isotropic during processing of plastic articles. There is also a need for such systems and methods to be less expensive and less highly specialized than existing systems and methods. There is yet a further need for such systems and methods to substantially diminish or eliminate the appearance of flowlines.

Foamed plastic articles containing special visual effect additives are not commonly available. One problem is that such additives are difficult to distribute uniformly throughout the foamed article, and special visual effects cannot be obtained. In addition, foamed articles containing such additives typically have poor surface quality.

BRIEF DESCRIPTION

In one embodiment the invention comprises a method for substantially diminishing or essentially eliminating a visible knitline in an article derived from a resinous composition comprising at least one thermoplastic resin and at least one special visual effect additive, which comprises the steps of (i) including in the composition an effective amount of at least one chemical foaming agent, and (ii) forming the article in a process that produces a knitline, wherein the article exhibits a substantially diminished or essentially no visible knitline compared to a similar article prepared without chemical foaming agent.

In another embodiment the invention comprises a resinous composition comprising (A) at least one thermoplastic resin, (B) at least one special visual effect additive, and (C) at least one chemical foaming agent present in an amount effective to provide a formed article of the composition with substantially diminished or essentially no visible knitline in a forming process that produces such a knitline in similar compositions not containing chemical foaming agent. Articles made from the compositions are also encompassed by the invention. Various other features, aspects, and advantages of the present invention will become more apparent with reference to the following description and appended claims.

BRIEF DESCRIPTION OF THE DRAWINGS

FIG. 1 shows plots of color for a molded plaque of a resinous composition comprising chemical foaming agent (section "B" of the plot) and also for a molded plaque of a similar resinous composition not comprising chemical foaming agent (section "A" of the plot).

DETAILED DESCRIPTION

In the following specification and the claims which follow, reference will be made to a number of terms which shall be defined to have the following meanings. The singular forms "a", "an" and "the" include plural referents unless the context clearly dictates otherwise. The terminology "knitlines" refers collectively to knitlines, flowlines, and/or weldlines in processed plastic articles. Knitlines may form in such illustrative processes as when there is a meeting of two or more melt-fronts originating, for example, from at least two separate melt streams or from one melt stream which is diverted into at least two streams which then reconverge.

In one embodiment a composition of the invention provides a substantially diminished knitline or essentially no visible knitline in an article formed from the composition in a process that would normally produce a knitline, such as in a multiply-gated mold or in particular in a double-gated mold, wherein there is a meeting of meltfronts. Unexpectedly, articles comprising a special visual effect additive can be made from a composition of the invention comprising chemical foaming agent without significantly diminishing desirable surface aesthetics such as gloss. Typically, the presence of both special visual effects additive and foaming agent would result in formed articles with greatly diminished surface appearance. Thus, compositions of the invention allow a wide variety of articles to be made that were not previously available because of poor surface appearance.

Thermoplastic resins suitable as resinous components in embodiments of compositions of the present invention include, but are not limited to, polyolefins, low density polyethylene (LDPE), high density polyethylene (HDPE), polypropylene (PP), polystyrene (PS), styrene-acrylonitrile copolymer (SAN), polycarbonates (PC), bisphenol A polycarbonate, polyesters, poly(ethylene terephthalate), poly(trimethylene terephthalate), poly(butylene terephthalate), polyamides, acrylonitrile-ethylene-styrene terpolymer (AES), acrylonitrile-butadiene-styrene terpolymer (ABS), acrylate-modified ABS, acrylonitrile-styrene-acrylate terpolymer (ASA), methyl methacrylate-modified ASA, acetals, acrylics, poly(methyl methacrylate) (PMMA), cellulose acetate, cellulose acetate butyrate, ethylene vinyl acetate, fluoropolymers, polyphenylene sulfides, polyetherimides, polyimides, polyphenylene ethers, poly(2,6-dimethyl-1,4-phenylene ether), thermoplastic polyurethanes, polysulfones, polyamides, polyethersulfones, polyarylsulfones, polyphenylsulfones, polyetherketones, polyetheretherketones, and like resins prepared by an addition or condensation process. Blends comprising at least one of these resins are also within the scope of the invention. Illustrative examples of blends include, but are not limited to, polyphenylene ether blends with polystyrene, polyphenylene ether blends with polyamide, ABS or acrylate-modified ABS blends with polycarbonate, ABS or acrylate-modified ABS blends with PMMA, ABS or acrylate-modified ABS blends with SAN, ASA or methyl methacrylate-modified ASA blends with polycarbonate, ASA or methyl methacrylate-modified ASA blends with PMMA, and ASA or methyl methacrylate-modified ASA blends with SAN. Also, any of these thermoplastic resins or blends may be used as the carrier resin in producing encapsulated foaming concentrates as described hereinafter.

Additives which provide special visual effects in compositions in embodiments of the invention comprise those which provide at least one of a color, a sparkle effect, a metallic sparkle, a metallic luster, a metallescent effect, an angular metamerism effect, a pearlescent effect, an appearance resembling stone or resembling granite, or like effects. Illustrative examples of such additives comprise colorants, dyes, pigments, mineral flakes, mica, glass flakes, fibers or spheres, particles of crosslinked polymer such as crosslinked acrylic resin, metal flakes, or the like, or mixtures comprising at least one of such additives. In some illustrative embodiments a single special visual effect additive, such as a dye or a colorant or mineral flakes or metallic flakes, is present. In other illustrative embodiments at least two special visual effect additives are present, such as, but not limited to, a combination of at least one dye or colorant with at least one of mineral flakes or metallic flakes.

In a particular embodiment suitable special visual effect additives comprise mineral flakes or metallic pigment which may be in the form of flakes. The metallic pigment typically has a mean particle size ranging from about 1 to about 3500 microns, preferably from about 1 to about 500 microns, preferably from about 10 to about 300 microns, and still more preferably from about 10 to about 100 microns. Preferred metallic pigments are based on metals of Groups 4, 6, 8, 9, 10, 11, 13, and 14 of the periodic table of the elements. Metallic pigments may be colored. Examples of these metallic pigments include aluminum, bronze, brass, chromium, copper, gold, iron, molybdenum, nickel, tin, titanium, zinc and the like. Metallic pigment may be produced by shredding to give a broad distribution of irregular particle shapes, or by die-cutting to give more limited particle size and shape. A "cornflake" type or corrugated irregularly shaped planar flake of metallic pigment such as of aluminum or bronze may be utilized, although a "silver dollar" type or a circular planar type of flake may also be utilized as metallic pigment. Glitter, which is a special type of aluminum pigment produced from foil, may also be utilized. The foil, typically rolled to gauges of less than 0.025 mm, is typically cut into square, rectangular or hexagonal shapes in sizes from 0.2 to about 3 mm, and typically coated with a transparent epoxy lacquer to halt oxidative dulling of the foil. Glitter, with its large particle sizes, can produce discrete highlights of metallic sparkle. Gold bronzes are typically alloys of copper and zinc with a small amount of aluminum to reduce oxidation. The range of gold colors is produced by varying proportions of major alloy components. In various examples a green gold alloy typically contains 70 percent copper, and color becomes redder as the percentage of copper is increased; 90 percent copper produces pale gold; deep gold is made by controlled oxidation of the alloys. Gold bronzes are usually utilized in flake form, with coarser grades giving more brilliance. Metallic flakes such as copper must be utilized with care, however, as they may be susceptible to heat, moisture and corrosives. The metallic pigment may optionally be coated, for example, with rosin or fatty acids, such as oleic or linoleic acid. Optionally, the metallic pigment may be initially in granular form comprising a carrier material, which may comprise at least one polymer. Suitable carrier materials comprise mineral oil, wax, polyethylene, oxidized polyethylene, poly(methyl methacrylate), or the like. In granular form the metallic pigment typically represents about 70-80% of the granule with the remainder being the carrier. Said pigments can be used to produce or enhance bright sparkle as well as hammer and leafing finishes in multilayer composites of the invention. Illustrative examples of suitable metallic pigments may comprise those with the tradename SILVET® available from Silberline Manufacturing Co., Tamaqua, Pa., those with the tradenames IRIODIN®, COLORSTREAM®, XIRALLIC®, BI-FLAIR®, and MINATEC® available from EMD Chemicals, Hawthorne, N.Y., and glitter products available from Meadowbrook Inventions, Inc., Bernardsville, N.J. Suitable special visual effect additives may also comprise a plurality of microsphere beads having a diameter in a range of about 1 to about 1300 microns, typically in a range of about 1 to about 850 microns, and more typically in a range of about 10 to about 200 microns. In a particular embodiment the beads are comprised of glass and have a diameter of about 50 microns. In another particular embodiment the beads are comprised of barium titanate.

Additives which provide special visual effects are used in compositions of the invention in one embodiment in an amount in a range of between about 0.005 parts per hundred parts resin by weight (phr) and about 25 phr, depending upon such factors as whether the resinous composition is substantially clear or opaque. For example, when the resinous composition is clear, less additive providing a special visual effect is used than when the resinous composition is opaque. As little as 0.005 phr mica or 0.01 phr metallic pigment such as aluminum may be employed in clear resinous compositions. In some particular embodiments a metallic pigment such as aluminum may be used in compositions of the invention in one embodiment in an amount in a range of between about 0.01 phr and about 10 phr, and in another embodiment in an amount of about 0.05 phr and about 8 phr, with about 1-4 phr being preferred. In other particular embodiments mineral flake such as mica may be used in compositions of the invention in one embodiment in an amount in a range of between about 0.005 phr and about 25 phr, and in another embodiment in an amount of about 0.01 phr and about 20 phr, with about 4-10 phr being preferred.

Chemical foaming agents in embodiments of compositions of the invention comprise a gas-forming moiety, and optionally additional chemical species as described hereinafter. Chemical foaming agents are typically either exothermic or endothermic in nature depending upon the chemistry involved. In some cases carbon dioxide is the gas released by the foaming agent while in other cases nitrogen is the product. In still other cases the foaming gas is an organic vapor. In some particular embodiments chemical foaming agents in compositions of the invention comprise an azo compound, an azodicarbonamide, a tetrazole, a hydrazide, a sulfonylhydrazide, a semicarbazide, a sulfonyl semicarbazide, a nitroso compound, a hydride compound, a hydrochlorofluorocarbon (HCFC), low boiling alcohols, ketones or hydrocarbons, an organic fluid which may comprise a low boiling liquid or a gas, a carbonate or a bicarbonate compound, or the like.

In other particular embodiments suitable chemical foaming agents include, but are not limited to, natural carbonates and bicarbonates such as calcite or calcium carbonate, bicarbonate of soda or sodium bicarbonate, lithium carbonate, or zinc carbonate. Synthetic carbonates may also be used such as, but not limited to, the hydrotalcite-like compound, DHT-4A made by Kyowa Chemical Industry Co., Ltd., dihydroxyaluminum sodium carbonates, dihydroxyaluminum calcium carbonates, aluminum hydroxide magnesium carbonates, or the HALOGARD® products made by Chattem Chemicals of Chattanooga, Tenn. Mixtures of natural carbonates and bicarbonates or of synthetic carbonates and bicarbonates or of synthetic and natural carbonates and bicarbonates are also encompassed in embodiments of the invention. In still other embodiments chemical foaming agents further comprise an organic acid. When the acid is present, any organic acid which will react with the carbonate to form carbon dioxide and water may be used. In particular embodiments suitable organic acids comprise organic acids which are normally solids at room temperature. In particular embodiments suitable organic acids include, but are not limited to, citric acid, malic acid, maleic acid, formic acid, glutaric acid, oxalic acid, succinic acid, fumaric acid, pyruvic acid, stearic acid, or the like, or mixtures thereof. Typically, when an organic acid is present, it is present in the foaming agent in an amount that is approximately stoichiometric in relation to the carbonate or bicarbonate species. In still other embodiments chemical foaming agents further comprise a fatty acid ester. Suitable fatty acid esters are known in the art and comprise such species as liquid sorbitol esters, glycerol monostearate, glycerol distearate, glycerol tristearate, pentaerithritol tetrastearate, or the corresponding palmitates, laurates, or oleates, or the like, or mixtures thereof. Various other additives such as, but not limited to, a molecular sieve material, a metal oxide or an alkaline earth metal oxide such as calcium oxide or the like may optionally be included in chemical foaming agents. In some particular embodiments suitable chemical foaming agents comprise those which are FDA approved to be used in food grade resins or products handling food.

In some preferred embodiments the chemical foaming agent is provided as a concentrate in the form of pellets wherein the active chemical foaming agent and optional additives are encapsulated in a carrier resin. Pellets comprising chemical foaming agent are advantageous to use because of such factors as convenience of handling. The carrier resin may be the same or different from the resin desired to be foamed. In addition, carrier resins may comprise thermoplastic resins such as ethylene-acrylic acid copolymer (EAA), ethylene-methacrylic acid copolymer (EMA), polyvinylchloride (PVC) and the ethylene-based copolymers neutralized with metal salts, forming ionic clusters and known as ionomers. When provided as an encapsulate or concentrate in a carrier resin, the active chemical foaming agent is typically present in one embodiment in an amount in a range of about 5 wt. % to about 80 wt. % based on the weight of the carrier resin and foaming agent, and in another embodiment in an amount in a range of about 5 wt. % to about 70 wt. % based on the weight of the carrier resin and foaming agent. Illustrative chemical foaming agents comprising a carbonate or bicarbonate moiety include, but are not limited to, CEL-SPAN™ 833 and CEL-SPAN™ 840 available from Phoenixplastics, Conroe, Tex. (www.phoenixplastics.com). Illustrative chemical foaming agents comprising an HCFC moiety include, but are not limited to, FORMACEL® materials available from DuPont, (www.dupont.com/formacel/pdf/h95639.pdf). Illustrative chemical foaming agents comprising an azodicarbonamide, a tetrazole, or a sulfonylhydrazide moiety, include, but are not limited to, CELOGEN® or EXPANDEX® materials available from Chemtura Corporation, Middlebury, Conn. Illustrative chemical foaming agents comprising a hydride moiety include, but are not limited to, sodium borohydride and the like. Other illustrative examples of suitable foaming agent materials are taught in U.S. Pat. Nos. 5,234,963, 5,611,962, 5,621,015, 5,710,189, and 5,847,017, or are available from Clariant Corporation (Charlotte, N.C.) under the tradename HYDROCEROL®. Those skilled in the art will recognize that there is no "universal" chemical foaming agent and that particular foaming agents need to be chosen on the basis of process temperature, gas solubility in the polymer melt, general gas/melt compatibility, and other factors readily determinable without undue experimentation.

Compositions in various embodiments of the invention comprise an amount of active chemical foaming agent sufficient to substantially diminish or eliminate a knitline in molded parts. In some particular instances compositions of the invention comprise an amount of active chemical foaming agent in one embodiment in a range of between about 0.1 phr and about 10 phr, in another embodiment in a range of between about 0.1 phr and about 5 phr, and in still another embodiment in a range of between about 0.2 phr and about 1.5 phr. Compositions comprising greater than about 10 phr of active chemical foaming agent tend to display unattractive surface effects, while compositions comprising less than about 0.1 phr of active chemical foaming agent tend to show undesirable knitline appearance. In some embodiments the amount of active chemical foaming agent is such to provide a molded article with a surface exhibiting less than 8% standard deviation in gloss measurements and less than 16% decrease in surface gloss measured at an angle of 60 degrees according to standard protocols such as ASTM D 523 or DIN 67530 or ISO 2813 compared to gloss measurements on a similar molded article for a composition not containing active chemical foaming agent and having a gloss value greater than about 80% in one embodiment and greater than about 90% in another embodiment. In still other embodiments the amount of active chemical foaming agent is such to provide a molded article with a surface exhibiting less than 5% standard deviation in gloss measurements and less than 12% decrease in surface gloss measured at an angle of 60 degrees according to standard protocols such as ASTM D 523 or DIN 67530 or ISO 2813 compared to gloss measurements on a similar molded article for a composition not containing active chemical foaming agent and having a gloss value greater than about 80% in one embodiment and greater than about 90% in another embodiment.

Compositions of the present invention may optionally comprise additives known in the art which do not substantially interfere with the special visual effect. Such optional additives include, but are not limited to, stabilizers, such as color stabilizers, heat stabilizers, light stabilizers, antioxidants, UV screeners, and UV absorbers; flame retardants, anti-drip agents, nucleating agents, lubricants, flow promoters and other processing aids; plasticizers, antistatic agents, mold release agents, impact modifiers, fillers, and other colorants such as dyes and pigments which may be organic, inorganic or organometallic; and like additives. In particular embodiments illustrative additives include, but are not limited to, poly(tetrafluoroethylene), silica, silicates, zeolites, titanium dioxide, stone powder, glass fibers or spheres, carbon fibers, carbon black, graphite, calcium carbonate, talc, lithopone, zinc oxide, zirconium silicate, iron oxides, diatomaceous earth, calcium carbonate, magnesium oxide, chromic oxide, zirconium oxide, aluminum oxide, crushed quartz, clay, calcined clay, talc, kaolin, asbestos, cellulose, wood flour, cork, cotton and synthetic textile fibers, and especially reinforcing fillers such as glass fibers, carbon fibers, and metal fibers. Often more than one additive is included in compositions of the invention, and in some embodiments more than one additive of one type is included. In a particular embodiment a composition of the invention comprises an additive selected from the group consisting of colorants, dyes, pigments, lubricants, stabilizers, heat stabilizers, light stabilizers, antioxidants, UV screeners, UV absorbers, fillers, poly(tetrafluoroethylene), and mixtures thereof.

In one embodiment the compositions of the present invention may be prepared by combining one or more thermoplastic resins, one or more special visual effect additives, and one or more chemical foaming agents to form a first mixture. The mixing can be typically carried out in any conventional mixer like drum mixers, ribbon mixers, vertical spiral mixers, Muller mixers, Henschel mixers, sigma mixers, chaotic mixers, static mixers or the like. The first mixture is then compounded under melt-mixing conditions using any conventional method, such as extrusion kneading or roll kneading, a two-roll mill, in a Banbury mixer or in a single screw or twin-screw extruder, or in any high shear mixing device to mix the components to produce an intimate mixture, and optionally, to reduce the composition so formed to particulate form, for example, by pelletizing or grinding the composition. The twin screw extruder, when employed, can be co-rotating, counter rotating, intermeshing, non-intermeshing, a planetary gear extruder, a co-continuous mixer, or the like. The compounding process can be a continuous, semi-continuous, or a batch process. In other embodiments all or a portion of special visual effect additive or chemical foaming agent or both, either neat or combined with a portion of thermoplastic resin, may be added to the composition at some stage of a blending process, such as in an extrusion process. Those of ordinary skill in the art will be able to adjust blending times, as well as component addition location and sequence, without undue additional experimentation. Also optionally, a portion of the thermoplastic resin may be mixed with special visual effect additive or chemical foaming agent or both, either separately or together, to prepare one or more master batches, and then the remaining thermoplastic resin may be combined therewith for multistage mixture. In one particular embodiment a thermoplastic resin is compounded with one or more special visual effect additives and provided in the form of pellets which are then combined and compounded with pelletized chemical foaming agent using methods described herein.

Articles comprising compositions described herein are also embodiments of the invention. Said articles include, but are not limited to, those typically used in applications requiring special visual effect properties, and particularly those wherein a visible knitline is detrimental to the appearance of the article. In some embodiments the articles comprise unitary articles. In still other embodiments the articles may comprise a sheet or film comprising a composition of the present invention. In other embodiments the articles may comprise a multilayer article comprising at least one layer comprising a composition of the present invention. Some particular suitable articles comprise outdoor and indoor signs, highway signs, traffic signs, horizontal signs, surface markers, guard rails, Jersey barriers; traffic barrels, tubes, and cones; and pavement or road markers and lines. Additional articles include, but are not limited to, articles for outdoor vehicle and device (OVAD) applications; exterior and interior components for aircraft, automotive, truck, military and emergency vehicles (including automotive, and water-borne vehicles), scooter, and motorcycle, including panels, quarter panels, rocker panels, vertical panels, horizontal panels, trim, pillars, center posts, fenders, doors, decklids, trunklids, hoods, bonnets, roofs, fascia, grilles, mirror housings, pillar appliques, cladding, body side moldings, wheel covers, door handles, spoilers, window frames, headlamp bezels, tail lamp housings, tail lamp bezels, license plate enclosures, and roof racks; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, fencing, decking planks, roofs; siding, particularly vinyl siding applications; floors, windows, decorative window furnishings or treatments; wall panels, and doors; enclosures, housings, panels, and parts for desk-top, portable or hand-held computers; enclosures, housings, panels, and parts for automatic teller machines (ATM); enclosures, housings, panels, and parts for stereos, tape players, iPod® and other consumer electronic equipment; enclosures, housings, panels, and parts for lawn and garden tractors, lawn mowers, and tools, including lawn and garden tools; window and door trim; sports equipment and toys; enclosures, housings, panels, and parts for recreational vehicle panels and components, such as snowmobiles; playground equipment; articles made from plastic-wood combinations; golf course markers; utility pit covers; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; and like applications.

Articles comprising compositions of the invention may be prepared by known thermoplastic processing techniques.

Such processing techniques include, but are not limited to, extrusion, kneading, profile extrusion, sheet extrusion, coextrusion, molding, extrusion blow molding, thermoforming, injection molding, co-injection molding and rotomolding. The invention further contemplates further optional fabrication operations on said articles, such as, but not limited to, in-mold decoration, baking in a paint oven, surface etching, lamination, and/or thermoforming. In a particular embodiment articles of the invention are made by an injection molding process. In a further particular embodiment articles of the invention are made by an injection molding process employing a multiply-gated or doubly-gated mold that would normally produce a distinct knitline in the molded parts. The fabrication process may be optimized without undue experimentation to produce articles with substantial diminishing or elimination of visible knitline in the formed article. Articles made in textured molds or in molds comprising a shim are also encompassed in embodiments of the invention.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples ABS was employed comprising structural units derived from 14 wt. % butadiene, 40 wt. % styrene, 4 wt. % acrylonitrile, and 42 wt. % methyl methacrylate. The chemical foaming agent comprising a mixture of at least one polycarbonic acid and a carbonate or bicarbonate moiety, available as CEL-SPAN™ 833 from Phoenixplastics, Conroe, Tex. Aluminum pigment had an average particle size of about 15-18 microns and was provided as pellets of aluminum contained in a carrier of polyethylene wax with a ratio of about 75% Al to 25% wax available as SPARKLE SILVET® 960-25-E1 from Silberline Co., Tamaqua, Pa. Special visual effect additives were precompounded with resins of interest before blending with chemical foaming agent.

EXAMPLE 1 AND COMPARATIVE EXAMPLE 1

A resinous composition was prepared by combining (i) ABS pellets comprising 1 phr of aluminum pigment with (ii) 3 parts per hundred parts resin by weight (phr) CEL-SPAN™ 833 in the form of pellets, and compounding the mixture. A comparative blend was prepared without CEL-SPAN™. The compositions were evaluated by injection molding into doubly-gated plaques designed to produce a distinct center knitline. The plaques had dimensions 10.2 centimeters (cm)×15.2 cm. and 0.3 cm. thick. Photographs of plaques of the blend comprising CEL-SPAN™ showed substantially diminished knitline or essentially no visible knitline. In contrast photographs of plaques of the comparative blend clearly showed the presence of a knitline.

The color of the plaques was measured using an Epson 1640SU flat bed scanner. The data were averaged along the machine direction and plotted along the transverse direction giving a numerical representation of knitline sharpness. The samples were scanned at 300 dots per inch (dpi) and resealed to 72 dpi using bilinear interpolation. Data were scanned in RGB color and converted to 8 bit gray scale. Scanning was performed using linear tone correction with gamma equal to approximately 3.1-3.28, and with highlight threshold equal to 264 and shadow threshold equal to 60. The plots of color for the composition containing CEL-SPAN™ (section "B" of the plot) and for the comparative composition without CEL-SPAN™ (section "A" of the plot) are shown in FIG. 1. The sample containing CEL-SPAN™ was brighter and showed substantially diminished knitline or essentially no visible knitline.

EXAMPLES 2-3 AND COMPARATIVE EXAMPLES 2-3

Resinous compositions were prepared by combining (i) ABS pellets comprising 1 phr of aluminum pigment with (ii) various levels of CEL-SPAN™ 833 in the form of pellets, and compounding the mixtures. Gloss was measured on molded parts at an angle of 60 degrees according to standard protocols such as ASTM D 523 or DIN 67530 or ISO 2813. A lower value for gloss standard deviation means that the test part surface is more uniform as is desired. Standard deviation measurements were obtained by measuring 10 parts. A comparative example without CEL-SPAN™ was also molded.

TABLE 1

| Ex. or C. Ex. | Additive amount (phr) | Average gloss | Standard deviation (%) |
|---|---|---|---|
| C. Ex. 2 | 0 | 96 | 0.41 |
| Ex. 2 | 1.5 | 93 | 2.04 |
| Ex. 3 | 3 | 86 | 3.29 |
| C. Ex. 3 | 10 | 66 | 21.3 |

The gloss data demonstrate that the presence of chemical foaming agent at a level of below about 7 phr provides desirably high gloss values in molded articles with adequately low values of standard deviation indicating good uniformity of the article's surface.

EXAMPLE 4 AND COMPARATIVE EXAMPLE 4

A resinous composition is prepared by combining (i) pellets comprising 1 phr of aluminum pigment in a resinous matrix of a blend of ABS with bisphenol A polycarbonate with (ii) an effective amount of CEL-SPAN™ 833 in the form of pellets, and compounding the mixture. A comparative blend is prepared without CEL-SPAN™. The compositions are evaluated by injection molding into doubly-gated plaques designed to produce a distinct center knitline. Photographs of plaques of the blend comprising CEL-SPAN™ show substantially diminished knitline. In contrast photographs of plaques of the comparative blend clearly show the presence of a knitline.

EXAMPLE 5 AND COMPARATIVE EXAMPLE 5

A resinous composition is prepared by combining (i) pellets comprising 1 phr of aluminum pigment in ASA resin with (ii) an effective amount of CEL-SPAN™ 833 in the form of pellets, and compounding the mixture. A comparative blend is prepared without CEL-SPAN™. The compositions are evaluated by injection molding into doubly-gated plaques designed to produce a distinct center knitline. Photographs of plaques of the blend comprising CEL-SPAN™ show substantially diminished knitline. In contrast photographs of plaques of the comparative blend clearly show the presence of a knitline.

EXAMPLE 6 AND COMPARATIVE EXAMPLE 6

A resinous composition is prepared by combining (i) pellets comprising 1 phr of aluminum pigment in bisphenol A polycarbonate with (ii) an effective amount of CEL-SPAN™

833 in the form of pellets, and compounding the mixture. A comparative blend is prepared without CEL-SPAN™. The compositions are evaluated by injection molding into doubly-gated plaques designed to produce a distinct center knitline. Photographs of plaques of the blend comprising CEL-SPAN™ show substantially diminished knitline. In contrast photographs of plaques of the comparative blend clearly show the presence of a knitline.

EXAMPLE 7 AND COMPARATIVE EXAMPLE 7

A resinous composition is prepared by combining (i) pellets comprising 4 phr of mica in ABS with (ii) an effective amount of CEL-SPAN™ 833 in the form of pellets, and compounding the mixture. A comparative blend is prepared without CEL-SPAN™. The compositions are evaluated by injection molding into doubly-gated plaques designed to produce a distinct center knitline. Photographs of plaques of the blend comprising CEL-SPAN™ show substantially diminished knitline. In contrast photographs of plaques of the comparative blend clearly show the presence of a knitline.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A method for substantially diminishing or essentially eliminating a visible knitline in an article derived from a resinous composition comprising
    (A) at least one thermoplastic resin selected from the group consisting of acrylonitrile-butadiene-styrene terpolymers (ABS), acrylate-modified ABS, acrylonitrile-styrene-acrylate terpolymers (ASA), methyl methacrylate-modified ASA, blends comprising at least one of these resins, ABS blends with polycarbonate, acrylate-modified ABS blends with polycarbonate, ABS blends with PMMA, acrylate-modified ABS blends with PMMA, ABS blends with SAN, acrylate-modified ABS blends with SAN, ASA blends with polycarbonate, methyl methacrylate-modified ASA blends with polycarbonate, ASA blends with PMMA, methyl methacrylate-modified ASA blends with PMMA, ASA blends with SAN, and methyl methacrylate-modified ASA blends with SAN;
    and (B) at least one special visual effect additive present in a range of between about 0.005 parts per hundred parts resin by weight (phr) and about 25 phr, selected from the group consisting of glass flakes, metallic pigments, metal flakes, aluminum pigment, crosslinked polymer particles, crosslinked acrylic resin, and mixtures comprising at least one of such additives,
    which comprises the steps of (i) including in the composition at least one chemical foaming agent selected from the group consisting of natural carbonates, natural bicarbonates, calcite, calcium carbonate, sodium bicarbonate, lithium carbonate, zinc carbonate, synthetic carbonates, dihydroxyaluminum sodium carbonates, dihydroxyaluminum calcium carbonates, aluminum hydroxide magnesium carbonates, and mixtures thereof, and (ii) forming the article in a process that produces a knitline,
    wherein the amount of chemical foaming agent is effective to provide a molded article having a surface gloss value greater than about 80%, wherein the gloss value exhibits less than 8% standard deviation and less than 16% decrease in value measured at an angle of 60 degrees according to ASTM D 523 compared to the gloss value measured on a similar molded article of a composition not containing chemical foaming agent, and wherein the article exhibits a substantially diminished or essentially no visible knitline compared to a similar article prepared without chemical foaming agent.

2. The method of claim 1, wherein the composition further comprises an additive selected from the group consisting of colorants, dyes, pigments, lubricants, stabilizers, heat stabilizers, light stabilizers, antioxidants, UV screeners, UV absorbers, fillers, poly(tetrafluoroethylene), and mixtures thereof.

3. An article prepared by the method of claim 1.

4. An article prepared by the method of claim 1 in a textured mold or in a mold comprising a shim.

5. A resinous composition comprising
    (A) at least one thermoplastic resin selected from the group consisting of acrylonitrile-butadiene-styrene terpolymers (ABS), acrylate-modified ABS, acrylonitrile-styrene-acrylate terpolymers (ASA), methyl methacrylate-modified ASA, blends comprising at least one of these resins, ABS blends with polycarbonate, acrylate-modified ABS blends with polycarbonate, ABS blends with PMMA, acrylate-modified ABS blends with PMMA, ABS blends with SAN, acrylate-modified ABS blends with SAN, ASA blends with polycarbonate, methyl methacrylate-modified ASA blends with polycarbonate, ASA blends with PMMA, methyl methacrylate-modified ASA blends with PMMA, ASA blends with SAN, and methyl methacrylate-modified ASA blends with SAN;
    (B) at least one special visual effect additive present in a range of between about 0.005 parts per hundred parts resin by weight (phr) and about 25 phr, selected from the group consisting of glass flakes, metallic pigments, metal flakes, aluminum pigment, crosslinked polymer particles, crosslinked acrylic resin, and mixtures comprising at least one of such additives;
    and (C) at least one chemical foaming agent selected from the group consisting of natural carbonates, natural bicarbonates, calcite, calcium carbonate, sodium bicarbonate, lithium carbonate, zinc carbonate, synthetic carbonates, dihydroxyaluminum sodium carbonates, dihydroxyaluminum calcium carbonates, aluminum hydroxide magnesium carbonates, and mixtures thereof, wherein the amount of chemical foaming agent is effective to provide a molded article of the composition having a surface gloss value greater than about 80%, wherein the gloss value exhibits less than 8% standard deviation and less than 16% decrease in value measured at an angle of 60 degrees according to ASTM D 523 compared to the gloss value measured on a similar molded article of a composition not containing chemical foaming agent, and wherein the article exhibits substantially diminished or essentially no visible knitline in a forming process that produces a knitline in similar compositions not containing chemical foaming agent.

6. The resinous composition of claim 5, wherein the composition further comprises an additive selected from the group consisting of colorants, dyes, pigments, lubricants, stabilizers, heat stabilizers, light stabilizers, antioxidants, UV screeners, UV absorbers, fillers, poly(tetrafluoroethylene), and mixtures thereof.

7. An article prepared from the composition of claim 5.

8. An article prepared from the composition of claim 5 in a textured mold or in a mold comprising a shim.

9. The method of claim 1, wherein the chemical foaming agent further comprises an organic acid.

10. The method of claim 1, wherein the special visual effect additive is aluminum pigment.

11. The method of claim 10, wherein aluminum pigment is present in an amount in a range of between about 0.05 phr and about 8 phr.

12. The resinous composition of claim 5, wherein the chemical foaming agent further comprises an organic acid.

13. The resinous composition of claim 5, wherein the special visual effect additive is aluminum pigment.

14. The resinous composition of claim 13, wherein aluminum pigment is present in an amount in a range of between about 0.05 phr and about 8 phr.

15. A method for substantially diminishing or essentially eliminating a visible knitline in an article derived from a resinous composition consisting essentially of
(A) at least one thermoplastic resin selected from the group consisting of acrylonitrile-butadiene-styrene terpolymers (ABS), acrylate-modified ABS, acrylonitrile-styrene-acrylate terpolymers (ASA), methyl methacrylate-modified ASA, blends comprising at least one of these resins, ABS blends with polycarbonate, acrylate-modified ABS blends with polycarbonate, ABS blends with PMMA, acrylate-modified ABS blends with PMMA, ABS blends with SAN, acrylate-modified ABS blends with SAN, ASA blends with polycarbonate, methyl methacrylate-modified ASA blends with polycarbonate, ASA blends with PMMA, methyl methacrylate-modified ASA blends with PMMA, ASA blends with SAN, and methyl methacrylate-modified ASA blends with SAN;
(B) aluminum pigment present in an amount in a range of between about 0.05 phr and about 8 phr, and
(C) an additive selected from the group consisting of colorants, dyes, pigments, lubricants, stabilizers, heat stabilizers, light stabilizers, antioxidants, UV screeners, UV absorbers, fillers, poly(tetrafluoroethylene), and mixtures thereof,
which comprises the steps of (i) including in the composition (a) at least one chemical foaming agent selected from the group consisting of natural carbonates, natural bicarbonates, calcite, calcium carbonate, sodium bicarbonate, lithium carbonate, zinc carbonate, synthetic carbonates, dihydroxyaluminum sodium carbonates, dihydroxyaluminum calcium carbonates, aluminum hydroxide magnesium carbonates, and mixtures thereof, and, optionally (b) an organic acid,
and (ii) forming the article in a process that produces a knitline,
wherein the amount of chemical foaming agent is effective to provide a molded article having a surface gloss value greater than about 80%, wherein the gloss value exhibits less than 8% standard deviation and less than 16% decrease in value measured at an angle of 60 degrees according to ASTM D 523 compared to the gloss value measured on a similar molded article of a composition not containing chemical foaming agent, and wherein the article exhibits a substantially diminished or essentially no visible knitline compared to a similar article prepared without chemical foaming agent.

16. An article prepared by the method of claim 15.

17. An article prepared by the method of claim 15 in a textured mold or in a mold comprising a shim.

18. A resinous composition consisting essentially of
(A) at least one thermoplastic resin selected from the group consisting of acrylonitrile-butadiene-styrene terpolymers (ABS), acrylate-modified ABS, acrylonitrile-styrene-acrylate terpolymers (ASA), methyl methacrylate-modified ASA, blends comprising at least one of these resins, ABS blends with polycarbonate, acrylate-modified ABS blends with polycarbonate, ABS blends with PMMA, acrylate-modified ABS blends with PMMA, ABS blends with SAN, acrylate-modified ABS blends with SAN, ASA blends with polycarbonate, methyl methacrylate-modified ASA blends with polycarbonate, ASA blends with PMMA, methyl methacrylate-modified ASA blends with PMMA, ASA blends with SAN, and methyl methacrylate-modified ASA blends with SAN;
(B) aluminum pigment present in an amount in a range of between about 0.05 phr and about 8 phr;
(C) (a) at least one chemical foaming agent selected from the group consisting of natural carbonates, natural bicarbonates, calcite, calcium carbonate, sodium bicarbonate, lithium carbonate, zinc carbonate, synthetic carbonates, dihydroxyaluminum sodium carbonates, dihydroxyaluminum calcium carbonates, aluminum hydroxide magnesium carbonates, and mixtures thereof, and, optionally, (b) an organic acid, and
(D) an additive selected from the group consisting of colorants, dyes, pigments, lubricants, stabilizers, heat stabilizers, light stabilizers, antioxidants, UV screeners, UV absorbers, fillers, poly(tetrafluoroethylene), and mixtures thereof,
wherein the amount of chemical foaming agent is effective to provide a molded article of the composition having a surface gloss value greater than about 80%, wherein the gloss value exhibits less than 8% standard deviation and less than 16% decrease in value measured at an angle of 60 degrees according to ASTM D 523 compared to the gloss value measured on a similar molded article of a composition not containing chemical foaming agent, and wherein the article exhibits substantially diminished or essentially no visible knitline in a forming process that produces a knitline in similar compositions not containing chemical foaming agent.

19. An article prepared from the composition of claim 18.

20. An article prepared from the composition of claim 18 in a textured mold or in a mold comprising a shim.

* * * * *